United States Patent
Ahn et al.

(10) Patent No.: US 9,910,202 B2
(45) Date of Patent: Mar. 6, 2018

(54) BACK LIGHT UNIT

(75) Inventors: Kyoung Soo Ahn, Seoul (KR); Sang Jun Park, Seoul (KR); Jae Hyuk Jang, Seoul (KR); Jong Sun Kim, Seoul (KR); Jeong Oh Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 129 days.

(21) Appl. No.: 13/976,842

(22) PCT Filed: Dec. 30, 2011

(86) PCT No.: PCT/KR2011/010354
§ 371 (c)(1),
(2), (4) Date: Jun. 27, 2013

(87) PCT Pub. No.: WO2012/091507
PCT Pub. Date: Jul. 5, 2012

(65) Prior Publication Data
US 2013/0279195 A1   Oct. 24, 2013

(30) Foreign Application Priority Data
Dec. 30, 2010   (KR) .................. 10-2010-0139353

(51) Int. Cl.
*F21V 8/00*   (2006.01)
*G02F 1/1335*  (2006.01)

(52) U.S. Cl.
CPC .......... *G02B 6/0011* (2013.01); *G02B 6/0021* (2013.01); *G02B 6/0036* (2013.01);
(Continued)

(58) Field of Classification Search
CPC .................. G02B 6/0021; G02F 1/133615
(Continued)

(56) References Cited

U.S. PATENT DOCUMENTS

2008/0175023 A1* 7/2008 Lee et al. .................. 362/613
2008/0192177 A1* 8/2008 Lin et al. .................... 349/65
(Continued)

FOREIGN PATENT DOCUMENTS

| JP | 09-005742 A | 1/1997 |
|---|---|---|
| JP | 2005-252082 A | 9/2005 |

(Continued)

OTHER PUBLICATIONS

Office Action dated Feb. 19, 2014, in Taiwanese Application No. 100149724.
(Continued)

*Primary Examiner* — Nimeshkumar Patel
*Assistant Examiner* — Jacob R Stern
(74) *Attorney, Agent, or Firm* — Saliwanchik, Lloyd & Eisenschenk

(57) ABSTRACT

The present invention relates to a structure of an edge-type back light unit, particularly to a structure comprising a light source receiving part, which receives a light source such as LED formed to the central direction of an optical plate at one side or the other side of the optical plate.

The present invention has excellent optical property and has an effect of wide application to various LCDs because it comprises a light source receiving part, which can install a printed circuit board mounting the light source such as LED to an embedded form in an edge-type back light unit.

13 Claims, 4 Drawing Sheets

(52) U.S. Cl.
CPC ..... *G02B 6/0091* (2013.01); *G02F 1/133615* (2013.01); *G02B 6/0083* (2013.01)

(58) Field of Classification Search
USPC ......................................................... 362/612
See application file for complete search history.

(56) References Cited

U.S. PATENT DOCUMENTS

| | | | |
|---|---|---|---|
| 2010/0290247 A1* | 11/2010 | Im ................................. | 362/606 |
| 2012/0236231 A1* | 9/2012 | Choi ..................... | G02B 6/009 |
| | | | 349/65 |

FOREIGN PATENT DOCUMENTS

| | | |
|---|---|---|
| KR | 10-2005-0094191 A | 9/2005 |
| KR | 10-2007-010517 A | 10/2007 |
| KR | 10-2009-0095366 A | 9/2009 |

OTHER PUBLICATIONS

International Search Report in International Application No. PCT/KR2011/010354, filed Dec. 30, 2011.

\* cited by examiner

[Fig. 1]
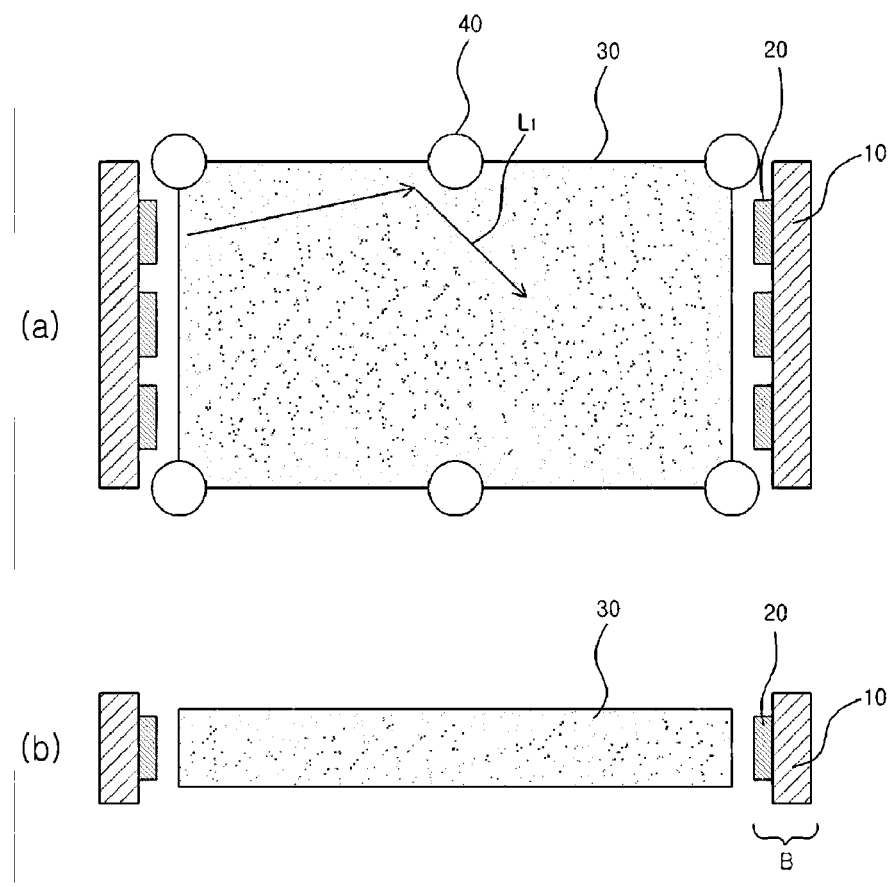

[Fig. 2]
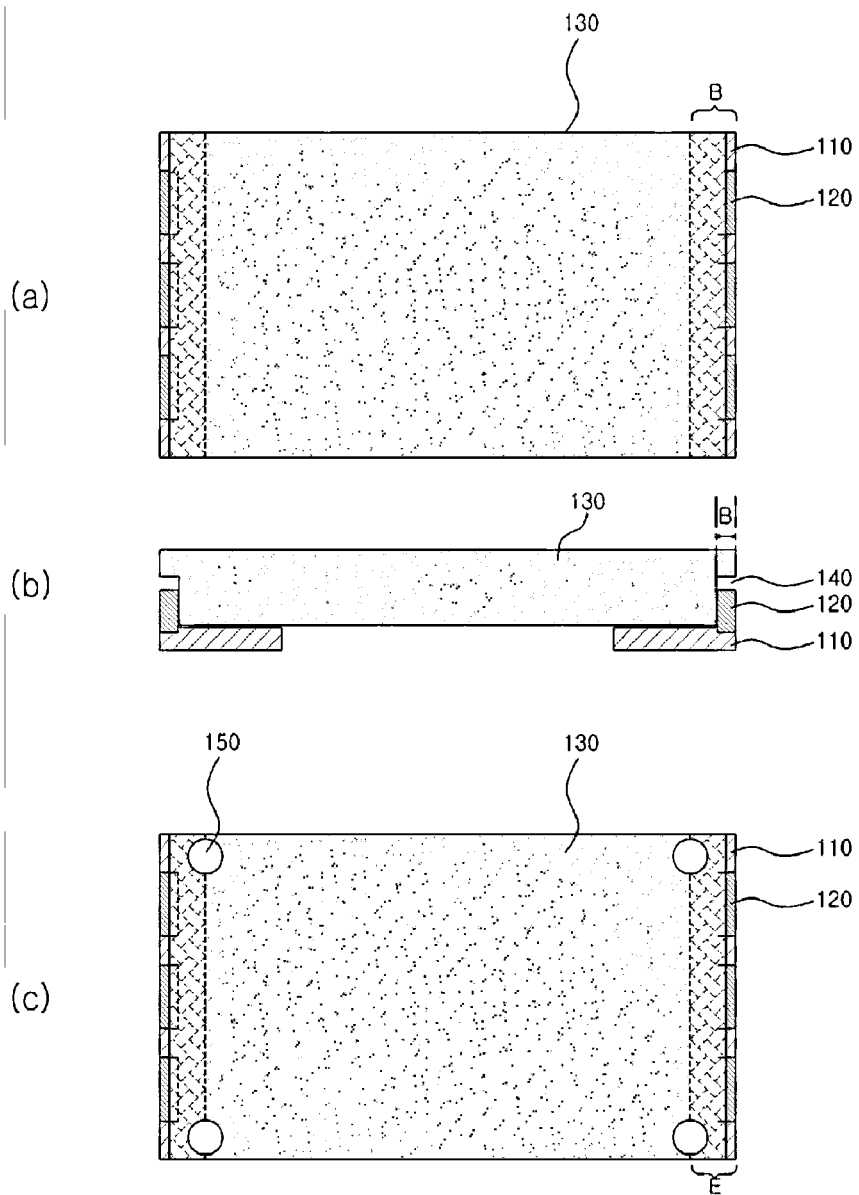

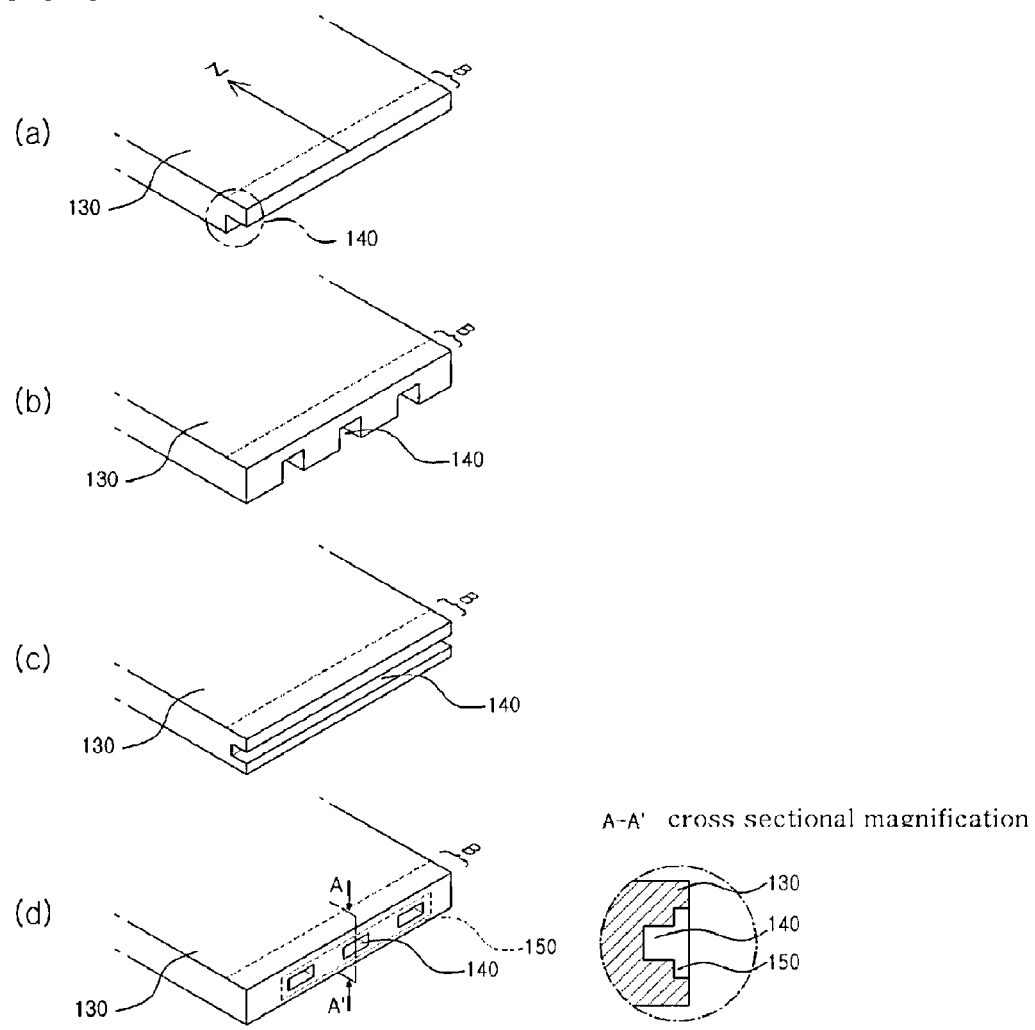
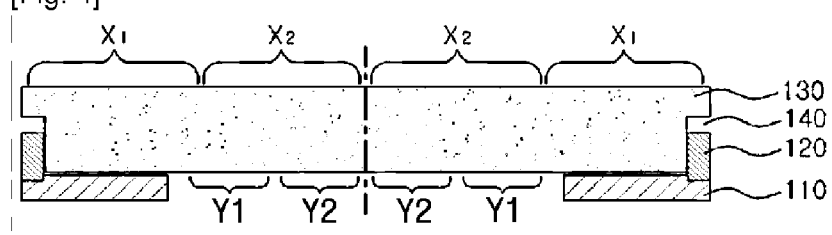

[Fig. 5]
(a) 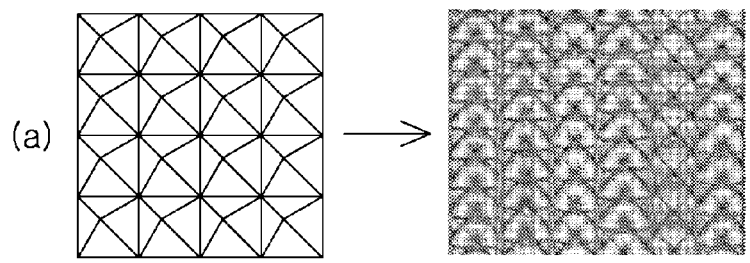
(b) 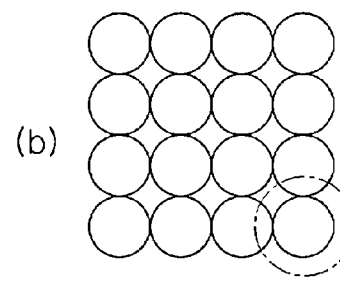
[Fig. 6]
(a) 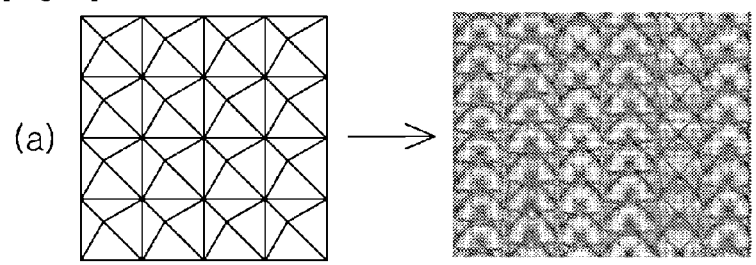
(b) 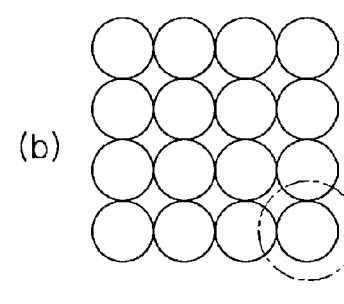

BACK LIGHT UNIT

CROSS-REFERENCE TO RELATED APPLICATIONS

This application is the U.S. national stage application of International Patent Application No. PCT/KR2011/010354, filed Dec. 30, 2011, which claims priority to Korean Application No. 10-2010-0139353, filed Dec. 30, 2010, the disclosures of each of which are incorporated herein by reference in their entirety.

TECHNICAL FIELD

The present disclosure relates to a structure of an edge-type back light unit.

BACKGROUND ART

A back light unit plays a role of evenly flashing a light to a reverse side of LCD, which does not flash a light on its own, to make a display image be visible, and a light guide plate is a parts performing the brightness of the back light unit and uniform lighting function, and one of plastic molding lens uniformly transferring the emitted light from a light source (LED) to the entire LCD plane.

FIG. 1 is a drawing illustrating a structure of the conventional edge-type back light unit.

As illustrated, the edge-type back light unit has a structure wherein a printed circuit board (10) having a LED light source (20) is arranged to the side part of a light guide plate, and the light emitted from the LED light source (20) is induced by the light guide plate (30) and exited onward.

DISCLOSURE OF INVENTION

Technical Problem

However, as illustrated, this structure has a problem to be difficult to be applied to various LCDs because a bezel (B) becomes increase by arranging the printed circuit board (10) and the LED light source (20) to the outside of the side face of the light guide plate. Further, in order to increase the light efficiency, it is particularly important to maintain the heights of the LED and a light incidence part of the light guide plate and distance therebetween constantly, but when the printed circuit board (10) and the LED light source (20) are fixed and arranged to the outside of the side face of the light guide plate, there is a problem that the position of the LED is twisted by stretching of the light guide plate due to heat generation.

In addition, when printed circuit board (10) and the LED light source (20) are arranged to the outside of the side face of the light guide plate, they are fixed by making a hole (40) to the light guide plate and inserting a pin thereinto. At this time, there also is a problem that the light is thrown out from the fixing hole (40) and it affects to the picture quality.

Solution to Problem

In order to solve the problems, one object of the present invention is to provide a structure of a back light unit, which has excellent optical property and can be widely applied to various LCDs by comprising a light source receiving part, which can install a printed circuit board mounting the light source such as LED to an embedded form.

The present invention, provided is a back light unit having one face and the other face opposite thereto, and comprising:
an optical plate guiding light;
a light source receiving part formed at the edge of the one face of the optical plate; and
a printed circuit board wherein a light source being inserted to the light source receiving part is mounted, and wherein at least part of the one face, the other face, the light source and the printed circuit board are partly overlapped one another, respectively.

Advantageous Effects of Invention

According to the present invention, the light source receiving part can be embodied to comprise at least one light source receiving groove formed at one or both sides of the one face.

The present invention has excellent optical property and has an effect of wide application to various LCDs because it comprises a light source receiving part, which can install a printed circuit board mounting the light source such as LED to an embedded form in an edge-type back light unit.

BRIEF DESCRIPTION OF DRAWINGS

The above and other objects, features and other advantages of the present invention will be more clearly understood from the following detailed description taken in conjunction with the accompanying drawings, in which:

FIG. 1 is a drawing illustrating a structure of the conventional edge-type back light unit;

FIG. 2 is (a) a plan view (b) a side view illustrating a structure of the edge-type back light unit according to the present invention, respectively;

FIG. 3 is a drawing illustrating other embodiment of the light source receiving part (B) according to the present invention;

FIG. 4 is a conceptional scheme illustrating other modified embodiment of the optical plate according to the present invention; and FIGS. 5 and 6 are drawings illustrating embodiments of the optical pattern according to the present invention.

DESCRIPTION OF SYMBOLS

110: printed circuit board
120: LED
130: optical plate
140: LED receiving part
Y1: the $1^{st}$ density pattern region
Y2: the $2^{nd}$ density pattern region
X1: the $3^{rd}$ density pattern region
X4: the $4^{th}$ density pattern region

MODE FOR THE INVENTION

Hereinafter, constitutions and functions according to the present invention will be described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. Terms such as "first", "second", "A", "B", etc. may be used in describing various constituent elements, but the constituent elements should not be limited by the terms. The terms are used only for differentiate one constituent element from other constituent elements.

FIG. 2 is (a) a plan view (b) a side view illustrating a structure of the edge-type back light unit according to the present invention, respectively.

Referring thereto, the back light unit according to the present invention has one face and the other face opposite thereto, and comprises: an optical plate (130) guiding light; a light source receiving part (140) formed at the edge of the one face of the optical plate; and a printed circuit board (110), wherein a light source (120) being inserted to the light source receiving part is mounted.

Particularly, the present invention is preferred that the at least part of the one face, the other face, the light source and the printed circuit board are partly overlapped, respectively, so as to minimize a bezel region. Herein, the term 'overlap' is a concept including that an overlapped region is presented on a plane view by inserting a part of each constituent into the inner part of the optical plate or embedded thereinto when assuming an upper plane view of the optical plate.

The light source (120) can be various light emitting bodies, and LED can be used in one embodiment of the present invention. Particularly, in this case, a side view LED, wherein a light exiting face is embodied to the side wall direction of the receiving part (140), can be used, and namely, the light source having a structure wherein the direction of the light emitted from the light source (120) is to the side wall not directly to the upper part can be used. Of course, a top view LED also can be applied thereto.

As illustrated in FIG. 2 (b), the light source receiving part (B) can be embodied to comprise at least one light source receiving groove (140) at one or both sides of the one face of the optical plate (130). Particularly, in this case, the light source receiving groove (140) can be embodied to a structure forming a stepped groove to a fixed depth at the side face of the optical plate (see FIG. 3 (a)).

In case of the stepped groove structure, the upper part of the receiving groove has an upper face of the optical plate in the light source receiving groove (140), but the lower face is formed to be opened so as to insert the light source from the lower direction.

As illustrated in FIG. 2 (b), the light source receiving groove is formed at one or both sides of the optical plate (130), and also the printed circuit board is arranged to the lower direction of the optical plate (130). Therefore, as described above, at least part of the one face of the optical plate, the other face thereof, the light source and the printed circuit board are partly overlapped one another, respectively, and one advantage that the bezel, which appears in the conventional back light unit, is almost or completely removed as much as the overlapped length is obtained.

Particularly, the light source (LED) is arranged to a structure wherein it is inserted into the inner part of the optical plate (130), and fixed. Therefore, the optical plate (130) and the light source (120) can secure fixed positions so as to show constant light property.

Particularly, in this case, the $1^{st}$ air gap can be formed between the light source receiving groove (140) and the light source (120) received thereto, and the air gap can have a width in a range of 0.001 µm~5 mm. This presence of the air gap can remove the hot spot and improve the light uniformity by controlling the light distribution. Further, when the air gap excesses 5 mm, the meaning of the slimized bezel falls; the efficiency is declined due to decrease of the light incided to the light guide plate; and particularly, it becomes more difficult to prevent increase of the hot spot due to increase of the lost light. Further, if the air gap is 0.001 µm (about 0) or more, the slimized bezel is meaningful; and the efficiency increases because the light can be incided directly to the light guide plate; and it is effective to remove the hot spot.

In addition, as illustrated in FIG. 2 (c), the printed circuit board can be fixed to the optical plate using a fixing subsidiary material such as a bolt to the one end of the light source receiving part (B) of the optical plate (130), and therefore, the problems such as image quality lowering due to light bounce can be solved.

Further, when LED is used as the light source, the LED and the optical plate are fixed, and if the light guide plate is stretched, the LED package is also stretched and if the plate is shrunken, the LED package is also shrunken. Therefore, it does not affect to the light property.

FIG. 3 is a drawing illustrating other embodiment of the light source receiving part (B) according to the present invention.

(a) is a drawing illustrating the light source receiving part having the stepped structure exemplified as one embodiment in FIG. 2. Namely, it is embodied to a stepped receiving line structure formed on the one or both sides of the one face of the optical plate, and the lower face of the optical plate (the lower stepped part) is opened, and the upper side is not opened so as to embody the light source receiving groove (140) to a line structure.

Further, as illustrated in (b), it is also possible to embody to a structure formed to comprise at least one light source receiving groove (140) formed at one or both sides of the one face of the optical plate (130).

(c) is a drawing illustrating a structure of the stepped receiving line wherein the light source receiving groove described in (a) is formed at one or both sides of the one face. It is embodied to a line structure formed along the edge of the optical plate (hereinafter, 'receiving line' structure), and also it can be embodied to insert the light source such as LED to the light source receiving groove (140).

Further, (d) is illustrating that for constituting the light source receiving part (B), the light source receiving part can comprise at least one light source receiving groove (140) formed at one or both sides of the one face, and particularly the second recessed groove (150) to which the printed circuit board can be inserted is form to a fixed thickness in the surrounding region of the light source receiving groove. Namely, through this, the light source such as LED can be accepted to the light source receiving groove (140) and the printed circuit board can be bound to the second recessed groove (150) in an embedded structure at the same time. Of course, in this case, the printed circuit board can be formed to one board, and can be divided and placed to unit substrates comprising at least one LED. In this structure, the printed circuit board can be arranged to the lower part of the optical plate, and it can be formed to the side face of the optical plate together with the LED in some cases. As described above, this structure can be a structure wherein at least part of the one face, the other face, the light source and the printed circuit board are partly overlapped one another, respectively to minimize the bezel region.

The second recessed groove (150) structure illustrated in FIG. 3 (d) can be applied to the structures illustrated in (a)~(c) so as to apply to form a groove having a structure embedding the printed circuit board.

FIG. 4 is a conceptional scheme illustrating other modified embodiment of the optical plate according to the present invention, and shows a structure to improve the light extracting efficiency and the light transfer efficiency and to reduce the hot spot by embodying various optical patterns on the optical plate.

The optical patterns can be formed on one face (the lower face) of the optical plate. Specifically, namely, the optical patterns are formed on one face (the lower face) of the optical plate (130), but on the surface of the region wherein the receiving part is not formed, preferably.

Specifically, on the one face of the optical plate (130), the $1^{st}$ density pattern region (Y1) and the $2^{nd}$ density pattern region (Y2) having higher pattern density than the $1^{st}$ density pattern region, and particularly, it is more preferred that the $1^{st}$ density pattern region is arranged to a region near to the light exiting face of the LED. In this case, the $1^{st}$ and the $2^{nd}$ density pattern regions can be embodied to an overlapped structure of independent structures of an intaglio structure or independent deposition structure.

Namely, the $1^{st}$ and the $2^{nd}$ density pattern regions of the optical plate (130) can be embodied to have various sectional shapes (semi-circular, elliptic and irregular shapes and the like) of an intaglio structure to the inner direction of the surface of the optical plate, and in one embodiment according to the present invention, it can be a polypyramid pattern or half-spherical pattern.

Particularly, the $1^{st}$ density pattern region (Y1) can increase the extraction efficiency of the light from the light source such as LED so as to improve the light uniformity, and the $2^{nd}$ density pattern region (Y2) can improve the light diffusion and scattering by being formed to the higher density pattern than the $1^{st}$ density pattern region.

Further, other examples of the embodiment of the aforementioned optical pattern can be embodied as follows. Namely, it can be embodied to a structure formed by the optical pattern of a relief structure has the $3^{rd}$ density pattern region (X1) and the $4^{th}$ density pattern region (X2) having higher pattern density the $3^{th}$ density pattern region, and particularly, it is preferred that the $4^{th}$ density pattern region is arranged to a region near to a light exiting face of the light source such as LED.

The optical pattern making up the $3^{rd}$ and $4^{th}$ density pattern regions (X1 and X2) can be formed by overlapping or separating numerous projecting patterns of the relief structure one another. For example, in case of the $2^{nd}$ density pattern region (X2), the pattern density can be controlled by forming the numerous projecting patterns having the relief structure at closer gap, or by overlapping the parts of the projecting patterns because a pattern having higher density than the $1^{st}$ density pattern region (X1) should be formed.

Particularly, in this case, the $4^{th}$ density pattern region can be arranged to a region near to the light exiting face of the light source such as LED, more preferably. Namely, it is more preferred that the $4^{th}$ density pattern region (X2) is formed to a region near to the exiting face of the light source such as LED, and the $3^{rd}$ density pattern region (X1) is formed to a region far from the LED light exiting face. Namely, the $4^{th}$ density pattern region X2 formed on the upper face of the optical plate is formed to a high density pattern deposition or overlapped pattern, and placed near to the LED light exiting part so as to diffuse or scatter the incided strong light much. Therefore, it can reduce the hot spot.

Further, the $4^{th}$ density pattern region (X2) is formed on the surface of the optical plate of the vertical upper direction of the receiving groove forming position, and formed in a region within ⅕ of the $1^{st}$ distance (d1) to the neighboring receiving groove, preferably. More preferably, the forming limit of the $4^{th}$ density pattern is formed within a distance of 10 mm from the LED light exiting face (X3) so as to remove the generation of the hot spot.

On the other hand, the mentioned $3^{rd}$ density pattern region (X1) is formed to a single structure forming the projecting patterns of the relief structure independently so as to improve the function transferring the exited light to the far distance and the light extraction efficiency by lowering the pattern density, and therefore the light uniformity can be improved.

Examples of the shape of the optical pattern of the $1^{st}$ and $2^{nd}$ density pattern regions formed on the other face of the optical plate, or the $3^{rd}$ and $4^{th}$ density pattern regions formed on the one face of the optical plate will be described.

Of course, it is different in that the optical pattern of the $1^{st}$ and $2^{nd}$ density pattern regions in the aforementioned examples is formed to the intaglio structure, and the optical pattern of the $3^{rd}$ and $4^{th}$ density pattern regions is formed to the relief structure, but the patter shapes can be identically formed while the methods forming the intaglio and relief are basically different.

The structure illustrated in FIG. 5 (a) is a structure embodying the density pattern to a quadrangular pyramid as one example of the polypyramid. The left drawing of (a) is a structure placing the quadrangular pyramid patterns by large scale integration, and the right drawing thereof is a structure overlapping the parts of the quadrangular pyramid patterns to obtain higher density. As illustrated, the polypyramid pattern can be variously prescribed according to the bottom shape such as triangular pyramid, hexagonal pyramid and octagonal pyramid in addition to the quadrangular pyramid, and in the present invention, it is used as a meaning including a pyramid shape generally having vertexes (apexes).

Further, as illustrated in FIG. 5 (b), the optical pattern can be arranged to a half-spherical pattern according to the present invention, and as suggested in (a), the pattern density also can be increased by forming an arrangement of a dense structure or by overlapping the parts of the half-spherical patterns in the arrangement. Of course, according to the present invention, the concept of the half-spherical pattern includes various three-dimensional patterns not having pointed apexes as well as the half-spherical pattern. FIGS. 6 (a) and (b) are images illustrating embodiments which patches the quadrangular pyramid or the half-spherical pattern of FIG. 5 to lower density.

The present invention has excellent optical property and can be widely applied to various LCDs because it comprises a light source receiving part, which can install a printed circuit board mounting the light source such as LED to an embedded form in an edge-type back light unit. Particularly, the distance between an incidence part of a light guide plate and a light guide plate is maintained constantly by inserting and fixing the light source to the inside of the optical plate so as to obtain uniform light property, and the stability which can be affected by shrinkage and expansion of the light guide plate according to the heat deflection, can be obtained.

Further, it can significantly reduce the hot spot and can effectively extract and transfer light by having an air gap to the inner part of the receiving part, which receives the light source such LED, and by having an optical pattern to a light guide panel.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

The invention claimed is:

1. A back light unit comprising:
an optical plate guiding light having one face and the other face opposite thereto;
a light source receiving part formed at an edge of one face of the optical plate; and
a printed circuit board on which a light source being inserted to the light source receiving part is mounted, wherein at least part of the one face of the optical plate, the other face of the optical plate, the light source, and the printed circuit board are partly overlapped one another, respectively;
wherein the light source receiving part has a light source receiving groove formed at an end distant from the edge of the one face of the optical plate for receiving the light source, and a recessed groove connected with the light source receiving groove and formed at an end proximate to the edge of the one face of the optical plate for receiving the printed circuit board;
wherein the light source receiving part is disposed between the one face and the other face of the optical plate without penetrating the optical plate;
wherein the light source is disposed at a lateral side of the optical plate;
wherein the printed circuit board is divided into a plurality of parts and attached to a unit substrate comprising at least one light source; and
wherein the printed circuit board is embedded in the recessed groove.

2. The back light unit of claim 1, wherein the light source receiving groove is formed at the one face.

3. The back light unit of claim 1, wherein the light source receiving groove is formed at the one face and has a structure of stepped receiving line.

4. The back light unit of claim 1, wherein the light source is a side view type.

5. The back light unit of claim 1, wherein an air gap is embodied between a light incidence plane of the light source receiving part and the light source.

6. The back light unit of claim 5, wherein the air gap is 0.001 µm~5 mm.

7. The back light unit of claim 5, wherein the optical pattern of an intaglio structure has a $1^{st}$ density pattern region and a $2^{nd}$ density pattern region having higher pattern density the $1^{st}$ density pattern region, and the $1^{st}$ density pattern region is arranged near to a light exiting face of the light source.

8. The back light unit of claim 7, wherein the optical pattern of an intaglio structure has a polypyramid pattern or half-spherical pattern of an intaglio structure to the inner direction of the surface of the optical plate.

9. The back light unit of claim 5, wherein the optical pattern of a relief structure has a $3^{rd}$ density pattern region and a $4^{th}$ density pattern region having higher pattern density the $3^{rd}$ density pattern region, and the $4^{th}$ density pattern region is arranged near to a light exiting face of the light source.

10. The back light unit of claim 9, wherein the optical pattern of a relief structure is formed by overlapping or separating numerous projecting patterns of the relief structure one another.

11. The back light unit of claim 9, wherein the projecting pattern of the relief structure is a polypyramid pattern or half-spherical pattern.

12. A back light unit comprising:
an optical plate guiding light having one face and the other face opposite thereto;
a light source receiving part formed at an edge of one face of the optical plate; and
a printed circuit board on which a light source being inserted to the light source receiving part is mounted, wherein at least part of the one face of the optical plate, the other face of the optical plate, the light source, and the printed circuit board are partly overlapped one another, respectively;
wherein the light source receiving part comprises a receiving groove which is formed at one or both sides of the one face and has a structure of stepped receiving line;
wherein the receiving line is embodied to a structure wherein the lower stepped part composing the receiving line is opened;
wherein the light source is disposed at a lateral side of the optical plate;
wherein the printed circuit board is divided into a plurality of parts and attached to a unit substrate comprising at least one light source; and
wherein the printed circuit board is embedded in a recessed groove.

13. A back light unit comprising:
an optical plate guiding light having one face and the other face opposite thereto;
a light source receiving part formed at an edge of one face of the optical plate; and
a printed circuit board on which a light source being inserted to the light source receiving part is mounted, wherein at least part of the one face of the optical plate, the other face of the optical plate, the light source, and the printed circuit board are partly overlapped one another, respectively;
wherein an air gap is embodied between a light incidence plane of the light source receiving part and the light source;
wherein an optical pattern controlling the distribution of light emitting of the LED is embodied on the one or the other face, wherein an optical pattern of an intaglio structure is formed on the one face and an optical pattern of a relief structure is formed on the other face;
wherein the light source is disposed at a lateral side of the optical plate;
wherein the printed circuit board is divided into a plurality of parts and attached to a unit substrate comprising at least one light source; and
wherein the printed circuit board is embedded in a recessed groove.

* * * * *